US012621840B2

(12) United States Patent
     Zia et al.

(10) Patent No.: US 12,621,840 B2
(45) Date of Patent: May 5, 2026

(54) PLAYBACK STALL EXPECTATION REPORTING

(71) Applicant: Apple Inc., Cupertino, CA (US)

(72) Inventors: Waqar Zia, Munich (DE); Ping-Heng Kuo, London (GB); Haijing Hu, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 296 days.

(21) Appl. No.: 18/423,841

(22) Filed: Jan. 26, 2024

(65) Prior Publication Data

US 2024/0373434 A1     Nov. 7, 2024

Related U.S. Application Data

(60) Provisional application No. 63/518,756, filed on Aug. 10, 2023, provisional application No. 63/500,385, filed on May 5, 2023.

(51) Int. Cl.
    *H04W 72/23*     (2023.01)
    *H04W 24/10*     (2009.01)
    *H04W 88/06*     (2009.01)

(52) U.S. Cl.
    CPC ........... *H04W 72/23* (2023.01); *H04W 24/10* (2013.01); *H04W 88/06* (2013.01)

(58) Field of Classification Search
    CPC ...... H04W 72/23; H04W 24/10; H04W 88/06
    See application file for complete search history.

(56) References Cited

U.S. PATENT DOCUMENTS

| | | |
|---|---|---|
| 2016/0065419 A1 | 3/2016 | Szilagyi |
| 2022/0225142 A1 | 7/2022 | Li |
| 2025/0047573 A1* | 2/2025 | Lunardi .................. H04L 43/06 |

FOREIGN PATENT DOCUMENTS

| | | | |
|---|---|---|---|
| WO | 2022235187 | 11/2022 | |
| WO | WO-2022235187 A1 * | 11/2022 | ............ H04W 24/10 |

OTHER PUBLICATIONS

International Search Report for PCT/US2024/027024; Aug. 22, 2024.

* cited by examiner

*Primary Examiner* — Elton Williams
(74) *Attorney, Agent, or Firm* — Kowert, Hood, Munyon, Rankin & Goetzel, P.C.

(57)     ABSTRACT

This disclosure relates to techniques for reporting a playback stall expectation in a wireless communication system. A wireless link may be established between a wireless device and a cellular base station. The wireless device may receive an indication of a playback stall expectation event from an application executing on the wireless device. The wireless device may transmit information indicating the playback stall expectation event to the cellular base station.

20 Claims, 6 Drawing Sheets

| Key | Type | Description |
|---|---|---|
| PlaybackStall | | Object | An event when despite exhausting adaptation options available at the player, the player expects that a playback stall is expected. This event can for example be reported to a network (e.g., 3GPP network) that can assist the player in this situation. |
| | t | Real Time | The real time of the report. |
| | bufferLevel | BufferLevelEntryType | The observed buffer level, which may reflect the buffer level at the same time instance t above. |
| | stallTime | Real Time | The time instance when the player expects the playback stall will happen. |

| Key | Type | Description |
|---|---|---|
| PlaybackStall | Object | An event when despite exhausting adaptation options available at the player, the player expects that a playback stall is expected. This event can for example be reported to a network (e.g., 3GPP network) that can assist the player in this situation. |
| t | Real Time | The real time of the report. |
| bufferLevel | BufferLevelEntryType | The observed buffer level, which may reflect the buffer level at the same time instance t above. |
| stallTime | Real Time | The time instance when the player expects the playback stall will happen. |

*FIG. 8*

```
<xs:complexType name="QmcConfigurationType">
  <xs:sequence>
    <xs:element name="Range" type="RangeType" minOccurs="0" maxOccurs="unbounded"/>
    <xs:element name="LocationFilter" type="LocationFilterType" minOccurs="0"/>
    <xs:element name="StreamingSourceFilter" type="StreamingSourceFilterType"
minOccurs="0" maxOccurs="unbounded"/>
    <xs:any namespace="##other" processContents="lax" minOccurs="0"
maxOccurs="unbounded"/>
  </xs:sequence>
  <xs:attribute name="metrics" type="xs:string" use="required"/>
  <xs:attribute name="samplePercentage" type="xs:double" use="optional"/>
  <xs:attribute name="reportingInterval" type="xs:unsignedInt" use="optional"/>
  <xs:attribute name="maxReportingFrequency" type="xs:double" use="optional"/>
  <xs:attribute name="goeReferenceID" type="xs:hexBinary" use="optional"/>
  <xs:anyAttribute namespace="##other" processContents="lax"/>
</xs:complexType>
```

*FIG. 9*

PLAYBACK STALL EXPECTATION REPORTING

PRIORITY INFORMATION

This application claims priority to U.S. provisional patent application Ser. No. 63/500,385, entitled "Playback Stall Expectation Reporting," filed May 5, 2023, and to U.S. provisional patent application Ser. No. 63/518,756, entitled "Playback Stall Expectation Reporting," filed Aug. 10, 2023, which are both hereby incorporated by reference in their entirety as though fully and completely set forth herein.

FIELD

The present application relates to wireless communications, and more particularly to systems, apparatuses, and methods for reporting a playback stall expectation in a wireless communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever-increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus, it is very important to also reduce power requirements in UE device designs while allowing the UE device to maintain good transmit and receive abilities for improved communications. Accordingly, improvements in the field are desired.

SUMMARY

Embodiments are presented herein of apparatuses, systems, and methods for reporting a playback stall expectation in a wireless communication system.

According to the techniques described herein, an application executing on a wireless device may generate a playback stall expectation event, which may be based on determining that a playback stall is predicted to occur (or has already occurred), and which may include determining certain information regarding the playback stall expectation, such as how long until the predicted playback stall occurs and an amount of playback time currently buffered by the application. The application may provide information regarding the playback stall expectation event to a baseband processor/layer of the wireless device.

The baseband processor/layer of the wireless device may in turn provide information regarding the playback stall expectation event to a cellular base station that is serving the wireless device to provide connectivity to a cellular network. The information may be provided to the cellular base station using radio access network visible quality of experience metrics that are included in an application layer measurement report message, as one possibility.

The cellular base station may be able to use the information regarding the playback stall expectation event to determine whether, and when, to adjust the radio resource configuration for the wireless device, for example to provide assistance to the application and to attempt to prevent (or reduce the severity of) the playback stall. However, at least in some embodiments, the playback stall expectation event information provided to the cellular base station may not be prescriptive, and the network may be free to act as it deems best for overall network operation in view of the playback stall expectation event and any of various other considerations.

Note that the techniques described herein may be implemented in and/or used with a number of different types of devices, including but not limited to base stations, access points, cellular phones, portable media players, tablet computers, wearable devices, unmanned aerial vehicles, unmanned aerial controllers, automobiles and/or motorized vehicles, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIG. 8 is a table illustrating possible information that could be included in a playback stall expectation report, according to some embodiments; and FIG. 9 illustrates an example of an XML configuration that could be used to configure an application layer with a reporting configuration for indicating playback stall events, according to some embodiments.

Figure 1:
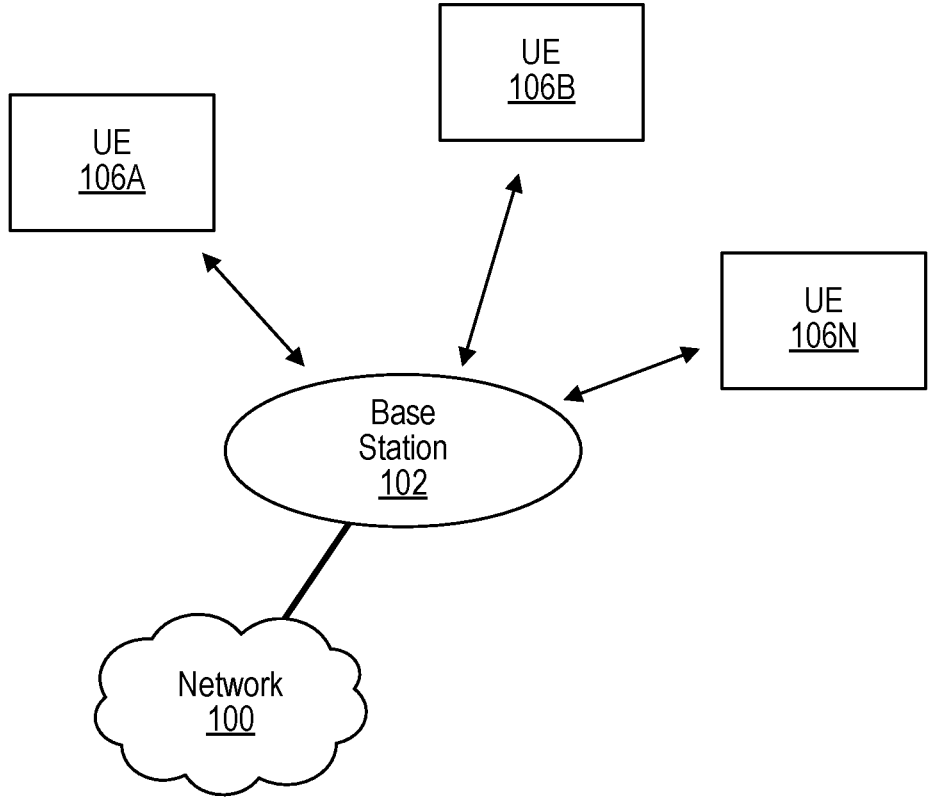
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

RF: Radio Frequency
UE: User Equipment
BS: Base Station
3GPP: Third Generation Partnership Project
LTE: Long Term Evolution
NR: New Radio Terms The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well as any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
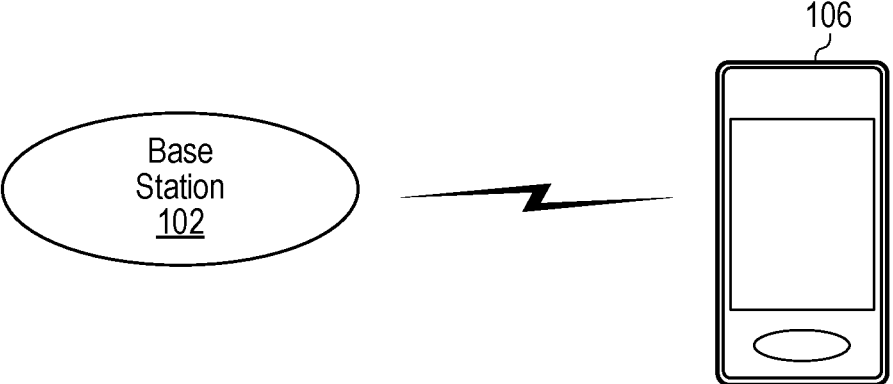
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of Ues, a base station may sometimes be considered as representing the network insofar as uplink and downlink communications of the UE are concerned. Thus, a UE communicating with one or more base stations in the network may also be interpreted as the UE communicating with the network.

Note that, at least in some 3GPP NR contexts, base station (gNB) functionality can be split between a centralized unit (CU) and a distributed unit (DU). The illustrated base station 102 may support the functionality of either or both of a CU or a DU, in such a network deployment context, at least according to some embodiments. In some instances, the base station 102 may be configured to act as an integrated access and backhaul (IAB) donor (e.g., including IAB donor CU and/or IAB donor DU functionality). In some instances, the base station 102 may be configured to act as an IAB node (e.g., including IAB mobile termination (MT) and IAB-DU functionality). Other implementations are also possible.

The base station 102 and the user devices may be configured to communicate over the transmission medium using any of various radio access technologies (RATs), also referred to as wireless communication technologies, or telecommunication standards, such as LTE, LTE-Advanced (LTE-A), LAA/LTE-U, 5G NR, ultra-wideband (UWB), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform techniques for reporting a playback stall expectation in a wireless communication system, such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, an unmanned aerial vehicle (UAV), an unmanned aerial controller (UAC), an automobile, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of LTE, LTE-A, 5G NR, Wi-Fi, BLUETOOTH™, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for multiple-input, multiple-output or "MIMO") for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include any number of antennas and may be configured to use the antennas to transmit and/or receive directional wireless signals (e.g., beams). Similarly, the BS 102 may also include any number of antennas and may be configured to use the antennas to transmit and/or receive directional wireless signals (e.g., beams). To receive and/or transmit such directional signals, the antennas of the UE 106 and/or BS 102 may be configured to apply different "weight" to different antennas. The process of applying these different weights may be referred to as "precoding".

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or NR, and separate radios for communicating using each of Wi-Fi and BLUETOOTH™. Other configurations are also possible.

Figure 3:
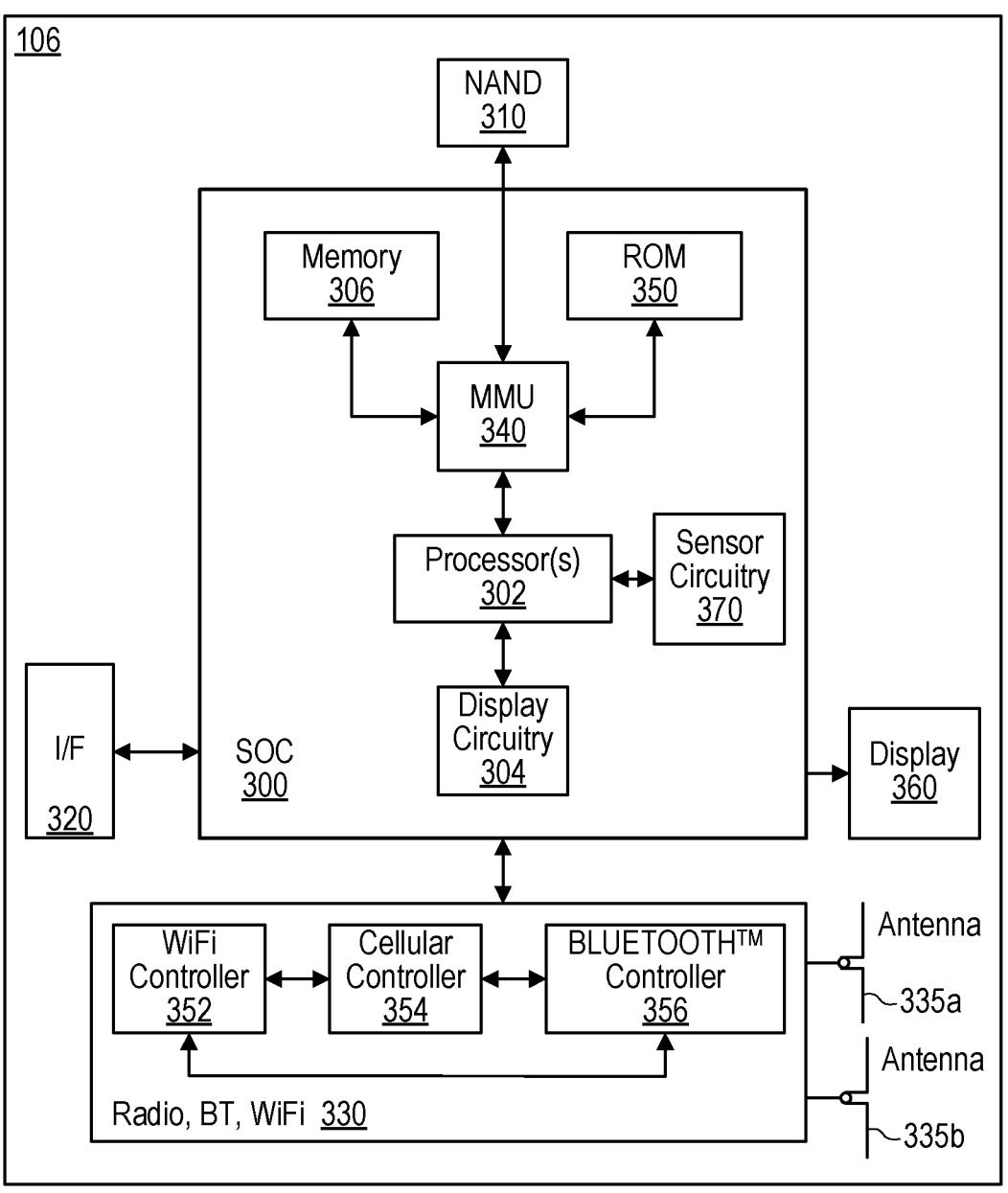
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. Some or all of the various illustrated components (and/or other device components not illustrated, e.g., in variations and alternative arrangements) may be "communicatively coupled" or "operatively coupled," which terms may be taken herein to mean components that can communicate, directly or indirectly, when the device is in operation.

As shown, the SOC 300 may include processor(s) 302 which may execute program instructions for the UE 106 and display circuitry 304 which may perform graphics processing and provide display signals to the display 360. The SOC 300 may also include sensor circuitry 370, which may include components for sensing or measuring any of a variety of possible characteristics or parameters of the UE 106. For example, the sensor circuitry 370 may include motion sensing circuitry configured to detect motion of the UE 106, for example using a gyroscope, accelerometer, and/or any of various other motion sensing components. As another possibility, the sensor circuitry 370 may include one or more temperature sensing components, for example for measuring the temperature of each of one or more antenna panels and/or other components of the UE 106. Any of various other possible types of sensor circuitry may also or alternatively be included in UE 106, as desired. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash memory 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, UWB, GPS, etc.). The UE device 106 may include or couple to at least one antenna (e.g., 335a), and possibly multiple antennas (e.g., illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. The communication circuitry may include multiple receive chains and/or multiple transmit chains for receiving and/or transmitting multiple spatial streams, such as in a multiple-input multiple output (MIMO) configuration. As noted above, the UE may be configured to communicate wirelessly using multiple wireless communication standards in some embodiments.

The UE 106 may include hardware and software components for implementing methods for the UE 106 to perform techniques for reporting a playback stall expectation in a wireless communication system, such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform techniques for reporting a playback stall expectation in a wireless communication system according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g., LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
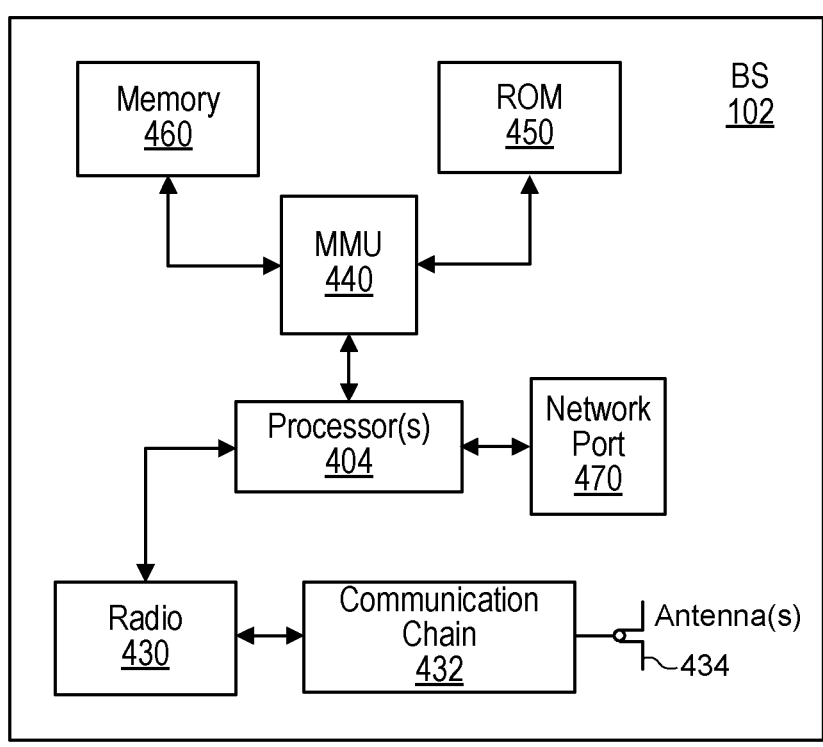
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transmission and reception points (TRPs). In addition, a UE capable of operating according to 5G NR may be connected to one or more TRPs within one or more gNBs.

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, 5G NR, 5G NR SAT, LTE, LTE-A, UWB, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, 5G NR SAT and Wi-Fi, LTE and Wi-Fi, etc.).

As described further subsequently herein, the BS 102 may include hardware and software components for implementing or supporting implementation of features described herein. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g., it may include at least one Ethernet port, and radio 430 may be designed to communicate according to the Wi-Fi standard.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
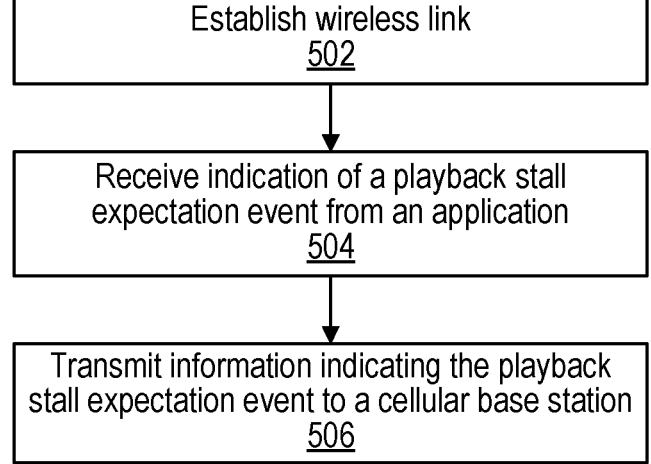
FIG. 5 is a flowchart diagram illustrating aspects of an exemplary possible method for reporting a playback stall expectation in a wireless communication system, according to some embodiments.

FIG. 5—Playback Stall Expectation Reporting

Quality of Experience (QoE) may encompass a variety of considerations that influence a user's overall perception of the quality of a service. Playback stalls (e.g., when playback of media is temporarily involuntarily paused) for streaming media applications may commonly be considered to have a negative impact on QoE, and so techniques for reducing or avoiding playback stalls may generally be beneficial for such streaming media applications.

In some embodiments, it may be possible to use buffer levels as a proxy metric for determining when a playback stall is likely to occur. For example, low buffer levels could be a symptom that the rate at which new data is received is too low to sustain continued playback, which could in turn cause a playback stall. However, scenarios may also be possible in which a low buffer is intentionally maintained even though the rate at which new data is received is sufficient to sustain continued playback, for example if media from a live event is being streamed, in which case playback closer to the live edge (which may correspond to a smaller buffer) may be preferable for better QoE.

In many instances, an application that is aware of its own context may be able to use that knowledge of its internal algorithms, the type of content playback being performed, etc., to predict when a playback stall may occur more accurately than an external entity (e.g., lower layers of the device on which the application is executing, or a radio access network providing the streaming data to the device, among other possibilities) can do so using buffer level information. Accordingly, supporting reporting of a playback stall expectation from an application to baseband, and from baseband to a radio access network (RAN), may improve the ability of the network to effectively respond to assist the application and potentially avoid playback stalls while avoiding or reducing unnecessary radio resource reconfiguration that could actually negatively impact QoE for the application and/or for other wireless devices operating in the network.

Thus, it may be beneficial to specify techniques for reporting a playback stall expectation. To illustrate one such set of possible techniques, FIG. 5 is a flowchart diagram illustrating a method for reporting a playback stall expectation in a wireless communication system, at least according to some embodiments.

Aspects of the method of FIG. 5 may be implemented by a wireless device, e.g., in conjunction with one or more cellular base stations, such as a UE 106 and a BS 102 illustrated in and described with respect to various of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

Note that while at least some elements of the method of FIG. 5 are described in a manner relating to the use of communication techniques and/or features associated with 3GPP and/or NR specification documents, such description is not intended to be limiting to the disclosure, and aspects of the method of FIG. 5 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 5 may operate as follows.

In 502, the wireless device may establish a wireless link with a cellular base station. According to some embodiments, the wireless link may include a cellular link according to 5G NR. For example, the wireless device may establish a session with an AMF entity of the cellular network by way of one or more gNBs that provide radio access to the cellular network. As another possibility, the wireless link may include a cellular link according to LTE. For example, the wireless device may establish a session with a mobility management entity of the cellular network by way of an eNB that provides radio access to the cellular network. Other types of cellular links are also possible, and the cellular network may also or alternatively operate according to another cellular communication technology, according to various embodiments.

Establishing the wireless link may include establishing a RRC connection with a serving cellular base station, at least according to some embodiments. Establishing the first RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. After establishing the RRC connection, the wireless device may operate in a RRC connected state. In some instances, the RRC connection may also be released (e.g., after a certain period of inactivity with respect to data communication), in which case the wireless device may operate in a RRC idle state or a RRC inactive state. In some instances, the wireless device may perform handover (e.g., while in RRC connected mode) or cell re-selection (e.g., while in RRC idle or RRC inactive mode) to a new serving cell, e.g., due to wireless device mobility, changing wireless medium conditions, and/or for any of various other possible reasons.

At least according to some embodiments, the wireless device may establish multiple wireless links, e.g., with multiple TRPs of the cellular network, according to a multi-TRP configuration. In such a scenario, the wireless device may be configured (e.g., via RRC signaling) with one or more transmission control indicators (TCIs), e.g., which may correspond to various beams that can be used to communicate with the TRPs. Further, it may be the case that one or more configured TCI states may be activated by media access control (MAC) control element (CE) for the wireless device at a particular time.

At least in some instances, establishing the wireless link(s) may include the wireless device providing capability information for the wireless device. Such capability information may include information relating to any of a variety of types of wireless device capabilities.

In 504, a baseband processor of the wireless device may receive an indication of a playback stall expectation event from an application executing on the wireless device. The application may generate the playback stall expectation event when the application determines that a playback stall is likely to occur (or possibly has already occurred) given the current circumstances, based on any of a variety of possible considerations at the application, for example including content type, playback progress, current and/or historical buffer levels, current and/or historical data rates, playback algorithm characteristics and parameters for the application, and/or any of various other considerations.

The indication may be received using a 3GPP based mechanism for reporting/sending messages from applications to lower (RAN) layers of the wireless device, in some embodiments. Such a mechanism may be configured by the network for use for reporting playback stall expectation event information when an application has no remaining internal playback stall prevention options, such as bitrate switching, available to the application, in some instances. Such a limitation may help prevent applications from requesting excessive or unnecessary assistance from a network, and/or may help improve the ability of the network to accurately determine when and how much assistance to provide to an application, at least according to some embodiments.

The application may indicate any of a variety of possible types of information regarding the expected playback stall. In some embodiments, the application may indicate timing for when the playback stall expectation event was generated. In some instances, the application may indicate an expected stall event delay (e.g., how long until the predicted playback stall is expected to occur), which may be indicated in reference to the timing of the report, as one possibility. It may also be possible for the application to indicate that a playback stall has already occurred, for example with an exception value, which could indicate that a playback stall has already occurred without indicating how long ago the playback stall occurred, or could provide an indication of when the playback stall occurred. As another possibility, it may be the case that the application does not report the expected stall event delay, or reports that the expected stall event delay is unknown (e.g., using a value encoded to indicate this in a specified field).

In some embodiments, the application may provide one or more buffer level values associated with the playback stall expectation event. For example, the application may indicate a buffer level (which could be represented as an amount of playback time buffered or an amount of data buffered, as various possibilities) for the application at the time instance of generation of the playback stall expectation event. As another possibility, the application could indicate a buffer level for the application at a second time instance, e.g., which may be subsequent to the time instance of generation of the playback stall expectation event. Note that if multiple types of information are provided for the playback stall expectation event, they may be reported together (e.g., as "first information" and "second information" both in the same reporting instance) or separately (e.g., as "first information" in a first reporting instance and as "second information" in a second reporting instance), according to various embodiments. For example, reporting of the second buffer level at the second time instance could be performed separately (e.g., at a later time) than reporting of the initial buffer level, or such information could be bundled and reported together, according to various embodiments. Similarly, it could be possible that an expected stall event delay could be reported at a different time (possibly with a time instance indication associated with when the expected stall event delay is reported) than buffer level reporting for the expected stall event (possibly with a time instance indication associated with the buffer level), or such information could be bundled and reported together, according to various embodiments.

In 506, the baseband processor of the wireless device may transmit information indicating the playback stall expectation event to the cellular base station. The information may be provided in any of a variety of possible ways. As one option, the information may be included in one or more information elements (IEs) or fields of IEs in an application layer measurement report, which may be transmitted using a signaling radio bearer (SRB), such as 3GPP NR SRB4/SRB5, or any SRB that can be used for QoE reporting. For example, one or more RAN visible QoE (RVQoE) metrics may be defined for reporting and/or providing information regarding playback stall expectation events and carried in the corresponding IEs/fields of such an application layer measurement report. In some embodiments, the wireless device may determine whether to perform event based RVQoE reporting or periodic RVQoE reporting to transmit the information indicating the playback stall expectation event to the cellular base station, for example based on the timing and/or severity of the playback stall expectation event, among various possible reasons, and may report the information using the selected type (e.g., event based or periodic) of RVQoE reporting.

The information indicating the playback stall expectation event that is transmitted to the cellular base station may include any or all of the information regarding the playback stall expectation event that the baseband processor received from the application. For example, information indicating when the playback stall expectation event was generated and/or information indicating the estimated delay until the expected playback stall may be transmitted to the cellular base station. If applicable, the indication of the estimated delay until the expected playback stall could include a value configured to indicate that the estimated delay until the expected playback stall is unknown. It may also be possible that an indication that the expected playback stall has already occurred is provided to the cellular base station; for example, the indication of the estimated delay until the expected playback stall could include an exception value configured to indicate that the expected playback stall has already occurred, and/or could include information indicating when the playback stall occurred.

If available, the information indicating the playback stall expectation event may also or alternatively include one or more buffer level values associated with the playback stall expectation event. For example, the information may include a buffer level for the application at the time instance of generation of the playback stall expectation event, and possibly a buffer level for the application at a second time instance, e.g., which may be subsequent to the time instance of generation of the playback stall expectation event. Note that if multiple types of information are provided for the playback stall expectation event, they may be reported together (e.g., as "first information" and "second information" both in the same reporting instance) or separately (e.g., as "first information" in a first reporting instance and as "second information" in a second reporting instance), according to various embodiments. For example, reporting of the second buffer level at the second time instance could be performed separately (e.g., at a later time and in a separate application layer measurement report message) than reporting of the initial buffer level, or such information could be bundled and reported together (e.g., at the same time and in the same application layer measurement report message), according to various embodiments. Similarly, it could be possible that an expected stall event delay could be reported at a different time (e.g., and in a separate application layer measurement report message) than buffer level reporting for the expected stall event, or such information could be bundled and reported together (e.g., at the same time and in the same application layer measurement report message), according to various embodiments.

In some embodiments, it may be possible that the number of reporting instances from the application layer to the baseband layer and from the baseband layer to the cellular base station for a given playback stall expectation event may be the same; for example, if "first information" and "second information" for a playback stall expectation event are reported by the application both in the same reporting instance, it may be the case that the baseband transmits the "first information" and "second information" for the playback stall expectation event both in the same application layer measurement report message, while if "first information" and "second information" for a playback stall expectation event are reported by the application in separate reporting instances, it may be the case that the baseband transmits the "first information" and "second information" for the playback stall expectation event in separate application layer measurement report messages. Alternatively, it may be possible that such reporting is decoupled; for example, it could be possible that even if "first information" and "second information" for a playback stall expectation event are reported by the application in separate reporting instances, it may be the case that the baseband bundles together and transmits the "first information" and "second information" for the playback stall expectation event both in the same application layer measurement report message. Other scenarios are also possible.

The cellular base station may receive the information indicating the playback stall expectation event from the wireless device. In some embodiments, the information indicating the playback stall expectation event may be included in an application layer measurement report from the wireless device, or possibly multiple application layer measurement reports. For example, as previously described herein, the application layer measurement report(s) could include one or more RVQoE metrics that convey the information regarding the playback stall expectation event, which may be received using event based or periodic RVQoE reporting.

The cellular base station may determine whether to reconfigure radio resources for the wireless device based at least in part on the playback stall expectation event for the wireless device. For example, the cellular base station may determine to allocate more resources to the wireless device to potentially prevent the predicted playback stall. If the cellular base station does determine to allocate more resources (or otherwise reconfigure resources) for the wireless device, the cellular base station may proceed with such reconfiguration. Note, though, that it may be up to the network implementation whether, when, and how to respond to the playback stall expectation event, potentially in consideration of any number of system parameters (e.g., QoE, cell load, subscription characteristics for the wireless device, etc.) and/or other factors, at least according to some embodiments. Thus, it may also be possible that the cellular base station determines to not reconfigure resources for the wireless device in response to the playback stall expectation event, for example in a scenario in which the cell is heavily loaded and additional resources are not readily available to allocate to the wireless device, or in a scenario in which the wireless device subscription does not support increased resource allocation above what the wireless device is already receiving, among other possible scenarios.

In some embodiments, the cellular network may configure a maximum frequency of reporting for playback stall expectation events, for example to prevent excessive use of such a reporting mechanism by applications. For example, the cellular base station may provide system configuration information or wireless device specific RRC configuration information indicating a configured maximum frequency of reporting for playback stall expectation events, with which the wireless device may be expected to comply.

Thus, at least according to some embodiments, the method of FIG. 5 may be used to provide a framework according to which a wireless device can report information regarding playback stall expectations to a cellular network, which may enable the cellular network to more accurately determine when assistance would potentially benefit the wireless device and to potentially respond with such assistance in a timely manner, at least in some instances.

FIGS. 6-9 and Additional Information

The following additional information illustrates further aspects that might be used in conjunction with the method of FIG. 5 if desired. It should be noted, however, that the exemplary details described in the following section are not intended to be limiting to the disclosure as a whole: numerous variations and alternatives to the details provided herein below are possible and should be considered within the scope of the disclosure.

A radio access network (RAN) visible Quality of Experience (QoE) framework in a 3GPP communication system could include a framework for buffer-level triggering. For example, such a framework may support an application executing on a UE providing buffer level information to an access stratum (AS) layer of the UE when the buffer level is below a certain (e.g., preconfigured) threshold. The AS of the UE can then provide a RAN visible QoE (RVQoE) report to the network (RAN) to report the received buffer level information. In some instances, the RAN may conclude from such a report that the application needs help, e.g., based on the RVQoE report of buffer level information, and may possibly modify network operation and/or radio resource allocations to provide such assistance.

The idea that a low buffer level is synonymous with bad QoE and vice versa may be commonly accepted for adaptive media streaming applications, at least in some instances. The expectation may be that if buffer level gets too low, a playback stall and/or re-buffering event is imminent, with the possible assumption that there is a direct relation between these two events. Several standards have specifications based on this; for example, the dynamic adaptive streaming over HTTP (DASH) standard as specified by 3GPP and MPEG may use this buffer level as one of the metrics that can be reported, and in 3GPP specifications, it may be possible that an application can report such buffer level information as a RVQoE metric (e.g., for periodic reporting), and the RAN may try to accommodate UEs accordingly.

It may be well established that a playback stall event is considered detrimental to QoE. However, it may actually be the case that the relation between a low buffer level and a playback stall event is not a simple direct relation, even if the two are commonly correlated. There may be several other factors that may complicate the relation between these two events.

As one consideration, a higher buffer level, although it may help reduce the probability of a playback stall, may also increase the playback latency. Increased end-to-end playback latency may itself be detrimental to QoE, especially for playback of live content, where low latency playback close to the live edge may be desired. Additionally, trying to build more buffer at startup may increase the startup delay, which may also be detrimental to QoE, at least in some instances. Accordingly, applications may be developed such as to strike a balance between conflicting or competing parameters and tuning them for the best possible achievable QoE. In many instances, an application may try to keep buffer levels relatively low as part of striking this balance. As available channel capacity may not be predictable with full accuracy, it may be the case that there is no closed-form solution to determine the optimal buffer level; this buffer level may always remain a tradeoff determined heuristically and statistically, for example using any of a variety of possible algorithms that may attempt to optimize for this. It should be noted, in the context of streaming applications, that the converse is also evident: full buffering may be equivalent to a progressive download: there may never be a stall, but it may not be considered streaming anymore.

Given that different ways of striking a balance between the various possible buffer level and latency related considerations are possible, it may be the case that two players playing the same content with the same conditions could potentially perform differently in terms of stall-events with the same buffer level. Additionally, it may be possible that different services, or different content of the same service, use different buffer levels even with the same player. Further, at least some smart live services may have sophisticated playback "catch-up" mechanisms implemented: if the buffer level becomes too large, such applications may very subtly increase the playback speed to catch up to the live edge, and, as a consequence, may deliberately lower the buffer level. Given all of these considerations, it may be the case that use of buffer level information from an application by a RAN or other entity outside of the application may have the potential to be ineffective and/or counterproductive, at least in some scenarios.

In addition to a buffer-level reporting mechanism, 3GPP TS 26.247 v.17.3.0 has defined a server and network assisted DASH (SAND) based "temporary delivery boost function." SAND may be a complex framework that requires network support, and is currently not widely deployed. The message sent from the application in this framework may be assumed to be imminent and may not explicitly indicate when the request is applicable in time, such that the network may have no way to assess the urgency of the request. The temporary delivery boost function itself may be a feature that limits the flexibility of the network response; instead of providing the information it has and allowing the network to determine its response (e.g., if it would boost bandwidth, temporarily or otherwise), such a request may specify the requested network response.

Accordingly, it may be desirable to provide a mechanism, for example under the 3GPP QoE framework, which allows an application to indicate its need for RAN actions, based on a metric that is more useful than the existing QoE metrics such as buffer level, without constraining the timing or manner of the network response to the indication. Techniques are described herein for such a mechanism, for an application to provide information about the need for potential RAN actions (e.g., resource re-configuration/optimization) to facilitate APP operation, with a simpler mechanism under the QoE framework.

Figure 6:
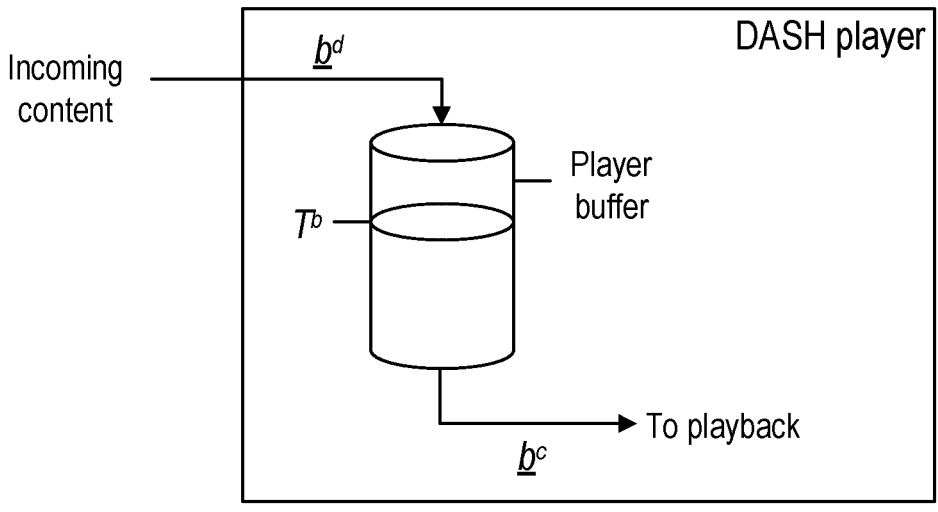
FIGS. 6-7 illustrate various aspects of buffer management for a DASH player, according to some embodiments.
Figure 7:
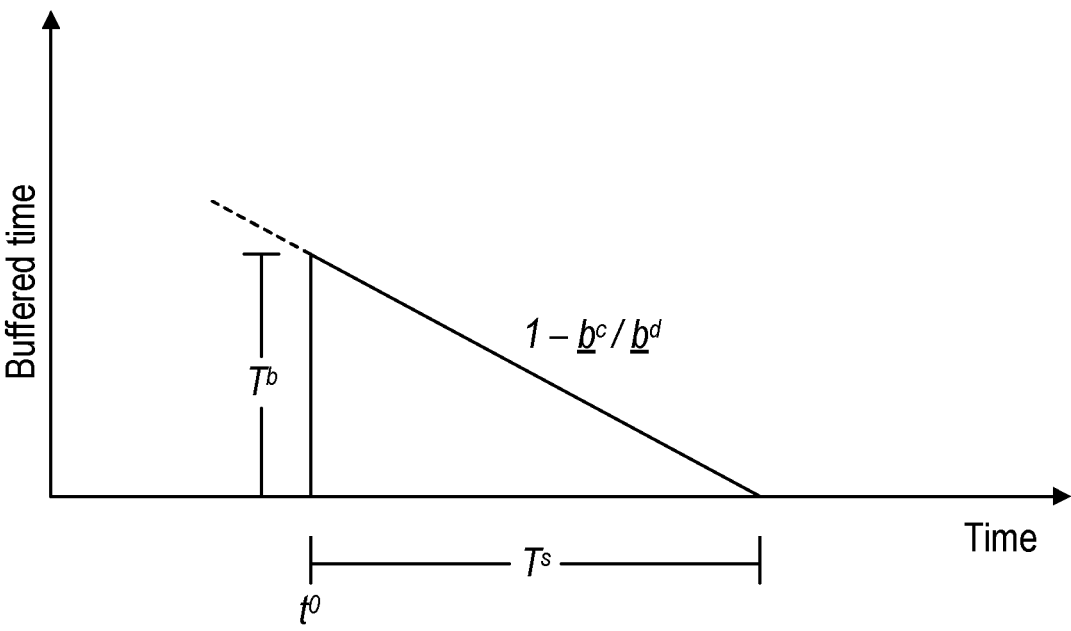

FIGS. 6-7 provide illustrations of various aspects of buffer management for a DASH player, according to some embodiments. FIG. 6 illustrates aspects of one possible linear model for buffer management. As shown, in the illustrated scenario, incoming content is being provided to a player buffer at a current average delivery bitrate $\underline{b}^d$. The buffer may at the same time be diminished by the current average minimal content (consumption) and desired bitrate $\underline{b}^c$. At any given moment, there may be a certain amount of time of content remaining in buffer P. Note that this may be smaller than the overall player buffer level, for example as a player may choose to stall playback even with some content remaining, in some instances. If $\underline{b}^c$ is larger than $\underline{b}^d$, the average bitrate boost needed to avoid an eventual stall may be $r=\underline{b}^c/\underline{b}^d$. In this case, the time to stall may be $T^s$, which may be larger than $T^b$ (e.g., at least in scenarios with non-zero $\underline{b}^d$ values) due to the time of content added to the buffer in $T^s$, which be referred to as $T^d$. FIG. 7 is a graph illustrating aspects of a scenario in which $\underline{b}^c$ is larger than $\underline{b}^d$, and thus in which a playback stall eventually occurs, according to such a model. Note that at least in some instances, the RAN may know only an approximation of $\underline{b}^d$, for example since the RAN may not be aware of any impact of above IP layer retransmissions.

As previously noted herein, in some instances, a player application may have means to switch content consumption bitrate, which can potentially reduce the effectiveness of buffer-level signaling, for example since such non-linear algorithmic switching may negate the effectiveness of linear mathematical modelling/estimation such as illustrated in FIGS. 6-7. As one option, it may be possible that this can be mitigated by allowing the signaling of a request for RAN assistance by an application only once it has exhausted all other means at its disposal (such as bitrate switching) to avoid a potential playback stall event. This may remove the switching ambiguity in the calculations, at least according to some embodiments.

As the RAN may not inherently know when and to what extent to help an application, it may be useful to identify what information would be necessary and sufficient for the application to provide to the RAN to be able to provide assistance (e.g., provided resources are available to do so). Following the model of FIGS. 6-7, it may be the case that:

$$T^s = T^b + T^d$$

where $T^d = (\underline{b}^d * T^s)/\underline{b}^c$ so $T^s = T^b + (\underline{b}^d * T^s)/\underline{b}^c$ or $T^b = T^s(1 - 1/r)$ or $T^b = T^s(1 - \underline{b}^c/\underline{b}^d)$ In the illustration of FIG. 7, stall time may occur when the sloping curve hits the horizontal time axis. In addition to RAN only having a rough estimate of $\underline{b}^d$ (since it may not be able to take into account application level retransmissions (e.g., TCP) and/or may not know the averaging time window used by the application for calculation of $\underline{b}^d$), all of the rest of these quantities may be natively unknown to RAN. Thus, it may be sufficient for at least two of the unknown quantities $T^b$, $T^s$, and r to be provided to the RAN by the application to be able to effectively assist the application. This may support a variety of approaches being possible, for example depending on which information is provided.

In some instances, it may be preferable not to directly send an indication of r, since, as noted, RAN and application calculation of bitrates and the averaging windows used can be different, and taking into account these factors may increase the complexity. Instead, it may be possible to send an indication of $T^b$ and then $T^{b'}$ at a later time. The slope of the plot can then be determined by the two measurements at the RAN, which may allow the RAN to effectively predict when the stall is expected to happen and how much of a boost is needed to avoid the stall. However, since this approach may rely on two readings, with one arriving at a later time, and given the potential time sensitivity of an expected stall event scenario, it may be possible that such an approach is less desirable than a solution in which all needed information can be reported in the earliest reporting occasion. An example of such an approach may include signaling P together with $T^b$, which may provide sufficient information for the RAN to be able to decide when and to what extent (e.g., with how much bitrate boost) to help the application.

The techniques may make use of the ability of a player application itself to determine that a playback stall is imminent. Such determination may commonly be made based on any of a variety of considerations, potentially including buffer level and/or any of various other variables and parameters, including those previously described herein and/or others. The exact mechanism may vary from player to player.

It may be the case that, at the beginning of a session, the RAN enables event-based RVQoE reporting. A maximum frequency with which an application may signal to the RAN may be negotiated and agreed between the RAN and the application. At a specific time during playback the application (player) may detect a need for assistance, and may determine to provide information relating to a "playback stall expectation" to the RAN. It may be assumed or explicitly agreed that the application has exhausted other means of preventing playback stall, such as bitrate switching, at this time. The application may provide information relating to the playback stall expectation event to the AS when the need is detected, e.g., using an existing mechanism for reporting/sending messages from application to lower/RAN layers.

Once the UE AS receives such information, the UE may include the information in an application layer measurement report message. For example, the stall expectation indication may be encoded as part of RVQoE metrics included in the message. The UE AS may transmit the application layer measurement report message to the network (e.g., to the serving gNB for the UE). The message can be transmitted via either signaling radio bearer (SRB) 4 or SRB 5, or any SRBs that can be used for QoE, according to various embodiments. The UE AS may determine if a RVQoE received from an application should be reported immediately (e.g., event based RVQoE reporting) or to rely on periodic reporting, for example based on the type/characteristic of the received RVQoE. Optionally, based on the received application layer measurement report message received from the UE, the gNB/network may decide to modify network operation (e.g., perform optimization and/or re-configuration of radio resources) based at least in part on the stall expectation indication.

The information relating to the playback stall expectation may include any of a variety of possible types of information, in any of a variety of levels of detail. One possible aspect may include the time of the event generation ($t^0$). Another possible aspect may include the expected stall event delay (e.g., from the timing of the report) $T^s$. A further possible aspect may include the time of content remaining in buffer (e.g., the current buffer level) $T^b$. As previously noted, such information may be useful to provide the context, allowing the network to better determine when the expected playback stall is estimated as being likely to occur, and how much assistance may be needed to prevent the playback stall. Note that it may be possible to support the expected stall event delay value being encoded as unknown (e.g., in case of a scenario in which the application is unable to estimate the expected stall event delay). In some instances, an exception value (e.g., less than 0) could be supported, for example to indicate that the stall has already happened. It may be possible that support is provided for such encoding to convey how long ago the stall happened, in such a scenario, or alternatively it may be possible that only one exception value is defined to indicate a stall that has already happened (e.g., regardless of how long ago it occurred), or that multiple exception values are possible but do not encode any implication regarding how long ago the playback stall occurred.

As noted herein, in some embodiments, it may be possible to configure a maximum frequency of reporting for playback stall expectation events, for example to prevent an application from inundating a RAN with these reports, whether benignly or out of misuse of the feature, e.g., in an attempt to unfairly gain QoE advantage. A RAN receiving such an indication may make its own decision whether to help an application reporting such an event, for example by allocating more resources to the UE (e.g., generally, or specifically to a flow serving the application reporting the event), potentially keeping in consideration any other applicable system parameters (e.g., QoE, cell load, subscription characteristics, etc.). At least in some embodiments, it may be the case that the exact RAN actions performed in response to an application reporting such an event are left to network implementation (e.g., out of the scope of 3GPP standardization).

As an example, FIG. 8 is a table illustrating possible information that could be included in a playback stall expectation report, according to some embodiments. As this information may represent a time critical event, a player may be able to improve its performance by its expedited reporting in appropriate scenarios. Note that alternatives and variations on the illustrated format are also possible.

FIG. 9 illustrates an example of an XML configuration that could be used to configure an application layer with a reporting configuration for indicating such playback stall events, according to some embodiments. Note in this case as well, alternatives and variations on the illustrated example are also possible.

Thus, such a framework for application reporting of an expected playback stall to a network may make use of relatively simple and existing QoE framework elements to provide information that the application may already have or be able generate and that can be correctly interpreted by the network, while allowing the network flexibility to determine how to respond to the information, and potentially further assisting the network with such decisions by conveying information regarding the imminence of the expected playback stall event. Further, at least in some embodiments, use of such playback stall expectation event reporting may potentially be considered a relatively privacy friendly manner of improving QoE, for example in comparison to QoE management approaches in which buffer level information for applications executing on a wireless device is sent to a network.

In the following further exemplary embodiments are provided.

One set of embodiments may include a method, comprising: by a baseband layer of a wireless device: establishing a wireless link with a cellular base station; receiving an indication of a playback stall expectation event from an application executed on an application layer of the wireless device; and transmitting information indicating the playback stall expectation event to the cellular base station.

According to some embodiments, the information indicating the playback stall expectation event includes one or more radio access network visible quality of experience (RVQoE) metrics in an application layer measurement report.

According to some embodiments, the application layer measurement report is transmitted using a signaling radio bearer.

According to some embodiments, the method further comprises, by the baseband layer of the wireless device: receiving an indication of when the playback stall expectation event was generated from the application; and transmitting information indicating when the playback stall expectation event was generated to the cellular base station.

According to some embodiments, the method further comprises, by the baseband layer of the wireless device: receiving an indication of an estimated delay until an expected playback stall from the application; and transmitting information indicating the estimated delay until the expected playback stall to the cellular base station.

According to some embodiments, the indication of the estimated delay until the expected playback stall includes one of more of: a value configured to indicate an amount of time from when the playback stall expectation event was generated to the expected playback stall; a value configured to indicate that the estimated delay until the expected playback stall is unknown; an exception value configured to indicate that the expected playback stall has already occurred; or a value configured to indicate when the playback stall occurred.

Another set of embodiments may include a wireless device, comprising: an antenna; a radio operably coupled to the antenna; and a processor operably coupled to the radio; wherein the wireless device is configured to: establish a wireless link with a cellular base station; determine that a playback stall expectation event has occurred; and transmit an application layer measurement report to the cellular base station, wherein the application layer measurement report includes one or more radio access network visible quality of experience (RVQoE) metrics configured to indicate the playback stall expectation event for the wireless device.

According to some embodiments, the wireless device is further configured to: receive, at a baseband layer of the wireless device, an indication of the playback stall expectation event from an application executed on an application layer of the wireless device.

According to some embodiments, the application layer measurement report includes information indicating when the playback stall expectation event was generated.

According to some embodiments, the application layer measurement report includes information indicating an estimated delay until an expected playback stall at the wireless device.

According to some embodiments, the application layer measurement report includes information indicating that a playback stall has already occurred at the wireless device.

According to some embodiments, the application layer measurement report includes information indicating when the playback stall occurred.

According to some embodiments, the application layer measurement report includes information indicating that an estimated delay until an expected playback stall is unknown.

Yet another set of embodiments may include an apparatus, comprising: a processor configured to cause a cellular base station to: establish a wireless link with a wireless device; and receive an application layer measurement report from the wireless device that was triggered by a playback stall expectation event occurrence on the wireless device, wherein the application layer measurement report includes one or more radio access network visible quality of experience (RVQoE) metrics configured to indicate the playback stall expectation event for the wireless device.

According to some embodiments, the application layer measurement report includes information indicating when the playback stall expectation event was generated.

According to some embodiments, the application layer measurement report includes information indicating an estimated delay until an expected playback stall at the wireless device.

According to some embodiments, the application layer measurement report includes information indicating that a playback stall has already occurred at the wireless device.

According to some embodiments, the application layer measurement report includes information indicating when the playback stall occurred.

According to some embodiments, the application layer measurement report includes information indicating that an estimated delay until an expected playback stall is unknown.

According to some embodiments, the processor is further configured to cause the cellular base station to: determine whether to reconfigure radio resources for the wireless device based at least in part on the playback stall expectation event for the wireless device; and reconfigure radio resources for the wireless device based at least in part on the determination of whether to reconfigure radio resources for the wireless device.

According to some embodiments, the application layer measurement report includes information indicating one or more buffer level values associated with the expected playback stall at the wireless device.

According to some embodiments, the processor is further configured to cause the cellular base station to: provide configuration information for reporting playback stall expectation event information to the wireless device, wherein reporting playback stall expectation event information is configured for only when an application has no remaining internal playback stall prevention options.

Still another set of embodiments may include a method, comprising: providing, by a baseband layer of a wireless device, configuration information for reporting playback stall expectation event information to an application executed on an application layer of the wireless device, wherein reporting playback stall expectation event information is configured for the application only when the application has no remaining internal playback stall prevention options; receiving, at a baseband layer of the wireless device, first information for a playback stall expectation event from the application, wherein the first information includes: a first time instance; and a first buffer level for the application, wherein the first buffer level corresponds to the first time instance; and transmitting the first information for the playback stall expectation event to a cellular base station.

According to some embodiments, the method further comprises: receiving, at the baseband layer of the wireless device, second information for the playback stall expectation event from the application, wherein the second information includes: a time instance when a playback stall is expected to occur for the application; and transmitting the second information for the playback stall expectation event to the cellular base station.

According to some embodiments, the method further comprises: determining whether to provide the first information for the playback stall expectation event using event based radio access network visible quality of experience (RVQoE) reporting or periodic RVQoE reporting.

According to some embodiments, the method further comprises: receiving, at the baseband layer of the wireless device, second information for the playback stall expectation event from the application, wherein the second information includes: a second time instance; and a second buffer level for the application, wherein the second buffer level corresponds to the second time instance; and transmitting the second information for the playback stall expectation event to the cellular base station.

According to some embodiments, the first information for the playback stall expectation event is transmitted to the cellular base station in a first application layer measurement report, wherein the second information for the playback stall expectation event is transmitted to the cellular base station in a second application layer measurement report.

According to some embodiments, the first information for the playback stall expectation event and the second information for the playback stall expectation event are transmitted to the cellular base station in a same application layer measurement report.

A further exemplary embodiment may include a method, comprising: performing, by a wireless device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processing element configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Embodiments of the present disclosure may be realized in any of various forms. For example, in some embodiments, the present subject matter may be realized as a computer-implemented method, a computer-readable memory medium, or a computer system. In other embodiments, the present subject matter may be realized using one or more custom-designed hardware devices such as ASICs. In other embodiments, the present subject matter may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method, comprising:
providing, by a baseband processor of a wireless device, configuration information for reporting playback stall expectation event information to an application executed on an application processor of the wireless device, wherein reporting playback stall expectation event information is configured for the application only when the application has no remaining internal playback stall prevention options;
receiving, at the baseband processor of the wireless device, first information for a playback stall expectation event from the application, wherein the first information includes:
a first time instance; and a first buffer level for the application, wherein the first buffer level corresponds to the first time instance; and
transmitting the first information for the playback stall expectation event to a cellular base station.

2. The method of claim 1, wherein the method further comprises:
receiving, at the baseband processor of the wireless device, second information for the playback stall expectation event from the application, wherein the second information includes:
a time instance when a playback stall is expected to occur for the application; and
transmitting the second information for the playback stall expectation event to the cellular base station.

3. The method of claim 1, wherein the method further comprises:
receiving, at the baseband processor of the wireless device, second information for the playback stall expectation event from the application, wherein the second information includes:
a second time instance; and
a second buffer level for the application, wherein the second buffer level corresponds to the second time instance; and
transmitting the second information for the playback stall expectation event to the cellular base station.

4. The method of claim 1, wherein the method further comprises:
receiving, at the baseband processor of the wireless device, second information for the playback stall expectation event from the application,
wherein the first information for the playback stall expectation event is transmitted to the cellular base station in a first application layer measurement report,
wherein the second information for the playback stall expectation event is transmitted to the cellular base station in a second application layer measurement report.

5. The method of claim 1, wherein the method further comprises:
receiving, at the baseband processor of the wireless device, second information for the playback stall expectation event from the application,
wherein the first information for the playback stall expectation event and the second information for the playback stall expectation event are transmitted to the cellular base station in a same application layer measurement report.

6. The method of claim 1, wherein the method further comprises:
determining whether to provide the first information for the playback stall expectation event using event-based radio access network visible quality of experience (RVQoE) reporting or periodic RVQoE reporting.

7. The method of claim 1, wherein determining whether to provide the first information for the playback stall expectation event is based at least in part on one or more of:
timing of the playback stall expectation event; or
severity of the playback stall expectation event.

8. An apparatus, comprising:
a processor configured to, when executing instructions stored in a memory, perform operations comprising:
providing, by a baseband processor of a wireless device, configuration information for reporting playback stall expectation event information to an application executed on an application processor of the wireless device, wherein reporting playback stall expectation event information is configured for the application only when the application has no remaining internal playback stall prevention options;

receiving, at the baseband processor of the wireless device, first information for a playback stall expectation event from the application, wherein the first information includes:

a first time instance; and a first buffer level for the application, wherein the first buffer level corresponds to the first time instance; and transmitting the first information for the playback stall expectation event to a cellular base station.

9. The apparatus of claim 8, wherein the operations further comprise:

receiving, at the baseband processor of the wireless device, second information for the playback stall expectation event from the application, wherein the second information includes:

a time instance when a playback stall is expected to occur for the application; and transmitting the second information for the playback stall expectation event to the cellular base station.

10. The apparatus of claim 8, wherein the operations further comprise:

receiving, at the baseband processor of the wireless device, second information for the playback stall expectation event from the application, wherein the second information includes:

a second time instance; and a second buffer level for the application, wherein the second buffer level corresponds to the second time instance; and transmitting the second information for the playback stall expectation event to the cellular base station.

11. The apparatus of claim 8, wherein the operations further comprise:

receiving, at the baseband processor of the wireless device, second information for the playback stall expectation event from the application, wherein the first information for the playback stall expectation event is transmitted to the cellular base station in a first application layer measurement report, wherein the second information for the playback stall expectation event is transmitted to the cellular base station in a second application layer measurement report.

12. The apparatus of claim 8, wherein the operations further comprise:

receiving, at the baseband processor of the wireless device, second information for the playback stall expectation event from the application, wherein the first information for the playback stall expectation event and the second information for the playback stall expectation event are transmitted to the cellular base station in a same application layer measurement report.

13. The apparatus of claim 8, wherein the operations further comprise:

determining whether to provide the first information for the playback stall expectation event using event-based radio access network visible quality of experience (RVQoE) reporting or periodic RVQoE reporting.

14. The apparatus of claim 8, wherein determining whether to provide the first information for the playback stall expectation event is based at least in part on one or more of:

timing of the playback stall expectation event; or severity of the playback stall expectation event.

15. The apparatus of claim 8, further comprising:

a radio operably coupled to the processor.

16. A non-transitory computer readable storage medium storing program instructions executable by one or more processors to perform operations comprising:

providing, by a baseband processor of a wireless device, configuration information for reporting playback stall expectation event information to an application executed on an application processor of the wireless device, wherein reporting playback stall expectation event information is configured for the application only when the application has no remaining internal playback stall prevention options;

receiving, at the baseband processor of the wireless device, first information for a playback stall expectation event from the application, wherein the first information includes:

a first time instance; and a first buffer level for the application, wherein the first buffer level corresponds to the first time instance; and transmitting the first information for the playback stall expectation event to a cellular base station.

17. The non-transitory computer readable storage medium of claim 16, wherein the operations further comprise:

receiving, at the baseband processor of the wireless device, second information for the playback stall expectation event from the application, wherein the second information includes:

a time instance when a playback stall is expected to occur for the application; and transmitting the second information for the playback stall expectation event to the cellular base station.

18. The non-transitory computer readable storage medium of claim 16, wherein the operations further comprise:

receiving, at the baseband processor of the wireless device, second information for the playback stall expectation event from the application, wherein the second information includes:

a second time instance; and a second buffer level for the application, wherein the second buffer level corresponds to the second time instance; and transmitting the second information for the playback stall expectation event to the cellular base station.

19. The non-transitory computer readable storage medium of claim 16, wherein the operations further comprise:

receiving, at the baseband processor of the wireless device, second information for the playback stall expectation event from the application, wherein the first information for the playback stall expectation event is transmitted to the cellular base station in a first application layer measurement report, wherein the second information for the playback stall expectation event is transmitted to the cellular base station in a second application layer measurement report.

20. The non-transitory computer readable storage medium of claim 16, wherein the operations further comprise:

receiving, at the baseband processor of the wireless device, second information for the playback stall expectation event from the application, wherein the first information for the playback stall expectation event and the second information for the playback stall expectation event are transmitted to the cellular base station in a same application layer measurement report.

\* \* \* \* \*